United States Patent
Hatazaki et al.

(10) Patent No.: US 9,789,891 B2
(45) Date of Patent: Oct. 17, 2017

(54) TRAIN CONTROL APPARATUS

(71) Applicant: THE NIPPON SIGNAL CO., LTD., Tokyo (JP)

(72) Inventors: Naoki Hatazaki, Kuki (JP); Hideyuki Kato, Kuki (JP)

(73) Assignee: THE NIPPON SIGNAL CO., LTD., Tokyo (JP)

( * ) Notice: Subject to any disclaimer, the term of this patent is extended or adjusted under 35 U.S.C. 154(b) by 84 days.

(21) Appl. No.: 14/498,409

(22) Filed: Sep. 26, 2014

(65) Prior Publication Data
US 2015/0008293 A1 Jan. 8, 2015

Related U.S. Application Data

(63) Continuation of application No. PCT/JP2013/057689, filed on Mar. 18, 2013.

(30) Foreign Application Priority Data

Mar. 30, 2012 (JP) .................................. 2012-082606

(51) Int. Cl.
| | | |
|---|---|---|
| *B61L 27/00* | (2006.01) | |
| *B61L 27/04* | (2006.01) | |
| *B61L 3/12* | (2006.01) | |
| *B61L 25/02* | (2006.01) | |

(52) U.S. Cl.
CPC ............... *B61L 27/04* (2013.01); *B61L 3/125* (2013.01); *B61L 25/02* (2013.01);
(Continued)

(58) Field of Classification Search
CPC ...... B61L 1/00; B61L 1/02; B61L 1/14; B61L 1/18; B61L 3/00; B61L 3/16; B61L 3/18;
(Continued)

(56) References Cited

U.S. PATENT DOCUMENTS

| | | | | |
|---|---|---|---|---|
| 5,420,883 A | * | 5/1995 | Swensen | ................ B61L 3/125 342/450 |
| 5,823,481 A | | 10/1998 | Gottschlich | |

FOREIGN PATENT DOCUMENTS

| | | |
|---|---|---|
| EP | 0 970 868 A1 | 10/2010 |
| JP | 2008-080981 A | 4/2008 |

(Continued)

OTHER PUBLICATIONS

Japanese Office Action (with English Translation) issued in Japanese Application No. 2012-082606 dated Jan. 26, 2016.
(Continued)

*Primary Examiner* — R. J. McCarry, Jr.
(74) *Attorney, Agent, or Firm* — Foley & Lardner LLP

(57) ABSTRACT

A train control apparatus includes: a first ground device 22a provided in a first section CZ1; and a second ground device 22b provided in a second section CZ2 continuing from the first section CZ1 in a train travel direction. When a train 10 in the first section CZ1 enters a control transition section ZCR determined using a control section border CZI as a termination end, the first ground device 22a instructs a first vehicle radio set 14r to send a first report signal RR1 to the first ground device 22a in accordance with a first communication condition determined by the first ground device 22a, and instructs a second vehicle radio set 14f to send a second report signal RF2 to the second ground device 22b in accordance with a second communication condition determined by the second ground device 22b. In response to the reception of the second report signal RF2 from the second vehicle radio set 14f, the second ground device 22b instructs the second vehicle radio set 14f to send a report signal including train location information to the second ground device 22b in accordance with the second communication condition.

6 Claims, 7 Drawing Sheets

(52) U.S. Cl.
CPC ....... *B61L 27/0005* (2013.01); *B61L 27/0038* (2013.01); *B61L 25/025* (2013.01); *B61L 25/026* (2013.01)

(58) Field of Classification Search
CPC .......... B61L 15/00; B61L 23/00; B61L 23/08; B61L 23/14; B61L 27/00
USPC ... 246/2 R, 3, 6, 7, 20–23, 27–30, 33, 34 A, 246/122 R–124
See application file for complete search history.

(56) References Cited

FOREIGN PATENT DOCUMENTS

| | | |
|---|---|---|
| JP | 2008-162548 A | 7/2008 |
| JP | 2009-225135 A | 10/2009 |
| JP | 2010-241281 A | 10/2010 |
| WO | WO-94/26571 A1 | 11/1994 |
| WO | WO 98/41435 A1 | 9/1998 |

OTHER PUBLICATIONS

CTCS-3 Train Control System RBC Handover Process Analysis, Yaju Wang, etc., Railway Signaling & Communication, Apr. 2010, vol. 46 No. 4, pp. 12-16.
Chinese Office Action dated May 19, 2016 as received in corresponding Chinese Application No. 201380017562.0 and its English translation thereof.
Chinese Office Action dated Nov. 15, 2016 as received in corresponding Chinese Application No. 201380017562.0 and its English translation thereof.

* cited by examiner

TRAIN CONTROL APPARATUS

This application is a continuation application of PCT/JP2013/057689, filed on Mar. 18, 2013.

BACKGROUND OF THE INVENTION

1. Field of the Invention

The present invention relates to a train control apparatus for wirelessly controlling a train via a plurality of ground devices disposed along a train travel path.

2. Description of Related Art

A train control apparatus of dividing a train travel path into a plurality of control sections and wirelessly controlling a train via ground devices disposed for the control sections has been practically used. In such a train control apparatus, each of the ground devices has a radio set and transmits and receives a signal related to a train control to and from a vehicle radio set mounted in a train. In a case in which a train enters from a control section to another control section continuing the control section, it is necessary to pass the control on the train from a ground device controlling the control section to a ground device controlling the another control section. As a technique addressing the necessity, there is a technique of passing the control on the train at the time point the train reaches a control section border as a border between successive control sections. Japanese Laid-Open Patent (Kokai) Publication No. 2008-080981 (JP 2008-080981 A) discloses a technique of setting a train location common detection region extending forward and backward in the train travel direction using the control section border as a center, sharing train location information transmitted from a vehicle radio set between ground devices controlling the control sections during the train travels in the region and, when both of the ground devices detect that the train reaches the control section border, passing over the control on the train.

In the technique of JP 2008-080981 A, in the train location common detection region, by transmitting the same train location information from the single vehicle radio set to two ground devices controlling neighboring control sections, both of the ground devices can detect the present location of the train. However, to prevent signal crosstalk between different control sections, there may be a case in which different communication conditions must be set in the control sections or the ground devices in practice. JP 2008-080981 A does not give an explicit teaching regarding this problem.

SUMMARY OF THE INVENTION

An object of the present invention is to provide a train control apparatus which contributes to safe train operation by appropriately switching the control on a train passing a control section border.

An aspect of the present invention provides a train control apparatus includes: a first ground device provided in a first section in a train travel path; and a second ground device provided in a second section in the train travel path, the second section continuing from the first section in a train travel direction. When a train in the first section enters a control transition section determined using a border between the first and second sections as a termination end, the first ground device instructs a first radio set mounted in the train to send a first report signal to the first ground device in accordance with a first communication condition determined by the first ground device, and instructs a second radio set mounted in the train to send a second report signal to the second ground device in accordance with a second communication condition determined by the second ground device, and the second ground device instructs the second radio set to send a report signal including train location information to the second ground device in accordance with the second communication condition in response to reception of the second report signal from the second radio set.

According to the embodiment of the present invention, when a train enters a control transition section, a first ground device instructs a first radio set (first vehicle radio set) mounted in the train to send back a first report signal, and the first ground device instructs a second radio set (second vehicle radio set) to send a second report signal to a second ground device. The first report signal from the first vehicle radio set is transmitted in accordance with a first communication condition determined by the first ground device. On the other hand, the second report signal from the second vehicle radio set is transmitted in accordance with a second communication condition determined by the second ground device. Therefore, even in a case in which the communication conditions employed by the first and second ground devices are different from each other, the second ground device can effectively receive the second report signal. In a case in which when the second ground device receives the second report signal from the second vehicle radio set, in response to the signal, the second ground device instructs the second vehicle radio set to send back a report signal including train location information. Consequently, the second ground device which takes over the control on the train (train control) from the first ground device can grasp the present location of the train. On the basis of the present location of the train, the train control can be switched from the first ground device to the second ground device.

DESCRIPTION OF THE PREFERRED EMBODIMENTS

Hereinbelow, an embodiment of the present invention will be described with reference to the drawings.

Figure 1:
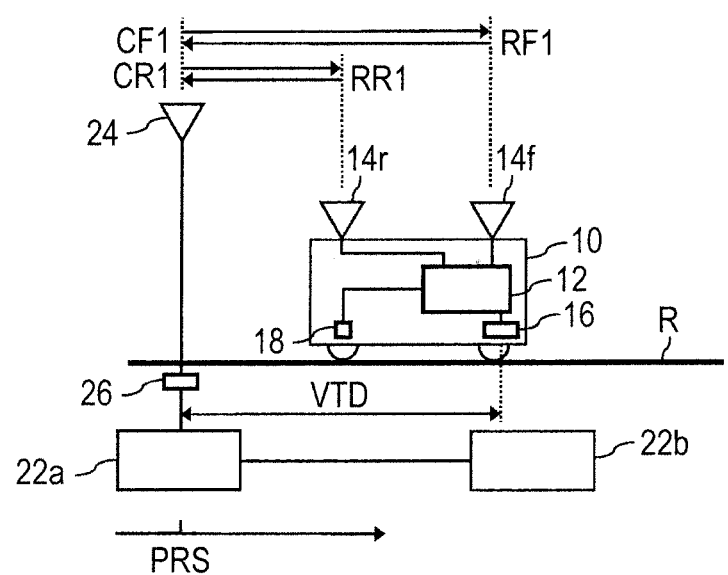
FIG. 1 is a configuration diagram of a train control apparatus according to an embodiment of the present invention.

FIG. 1 illustrates the configuration of a train control apparatus according to an embodiment of the present invention.

In the embodiment, a train travel path R along which a train 10 travels is divided into a plurality of sections (hereinbelow, referred to as "control sections") by predetermined distance, and a ground device 22 is installed in each of the control sections. FIG. 1 illustrates the train 10 which is present in one control section in the plurality of sections. A ground device provided in the control section is expressed by reference numeral 22a, and a ground device provided in a control section continued to the control section in the travel direction of the train 10 is expressed by reference numeral 22b. The ground devices 22a and 22b are connected to each other by a wire or wirelessly and can transmit and receive a signal to and from each other.

The train 10 has a vehicle radio set (hereinbelow, referred to as "front-side vehicle radio set") 14f in the first car and has a vehicle radio set (hereinbelow, referred to as "rear-side vehicle radio set") 14r in the last car. An on-board device 12 provided in the train 10 can transmit and receive a signal to and from the ground device 22a in the control section by the front-side vehicle radio set 14f and/or the rear-side vehicle radio set 14r. The front-side vehicle radio set 14f corresponds to a "second radio set", and the rear-side vehicle radio set 14r corresponds to a "first radio set". A plurality of ground radio sets 24, 24, . . . are provided at predetermined intervals along the train travel path R (FIG. 1 illustrates only one ground radio set 24 provided in the control section), and the on-board device 12 transmits signals from the front-side vehicle radio set 14f and the rear-side vehicle radio set 14r to the ground device 22a via the ground radio set 24. On the contrary, the on-board device 12 receives signals from the ground device 22a via the ground radio set 24 and the vehicle radio sets 14f and 14r.

In FIG. 1, reference characters CF indicate a signal (command signal) transmitted from the ground device 22a to the on-board device 12 via the front-side vehicle radio set 14f, and reference characters CR indicate a signal (command signal) transmitted from the ground device 22a to the on-board device 12 via the rear-side vehicle radio set 14r. Reference characters RF indicate a signal (report signal) transmitted from the on-board device 12 to the ground device 22a via the front-side vehicle radio set 14f, and reference characters RR indicate a signal (report signal) transmitted from the on-board device 12 to the ground device 22a via the rear-side vehicle radio set 14r.

The train 10 has an on-board receiver (hereinbelow, referred to as "on-board coil") 16 at the tip end portion of the first car, and an output signal of the on-board coil 16 is supplied to the on-board device 12. The on-board device 12 detects a signal (identification number of a ground coil 26) generated by the ground coil 26 installed on the ground in each of the control sections by the on-board coil 16, detects an absolute position PRS of the train 10, and measures a travel distance VTD in which the train 10 moved forward from the absolute position PRS on the basis of an output signal of a tachometer generator 18 which generates a pulse signal according to the rotation of the wheels. By adding the travel distance VTD to the absolute position PRS, the present location P of the train 10 is detected. The on-board device 12 can transmit the detected train location P to the ground device 22a by the report signals RF and RR.

Hereinbelow, the operation of the train control apparatus according to the embodiment will be described.

FIGS. 2 to 7 illustrate the flow of a series of control related to switching of the control on the train 10 in chronological order.

Description will be given with reference to FIG. 2. In the embodiment, a control section border CZI as a border between a control section (hereinbelow, referred to as "train-leaving control section") CZ1 in which the train 10 is presently traveling and a control section (hereinbelow, referred to as "train-entering control section") CZ2 continued to the control section CZ1 in the train travel direction is set as a stop point (hereinbelow, referred to as "train stop point") of the train 10. Unless a predetermined condition which will be described later is met, the train stop point CZI is maintained as a valid point, and passage of the train 10 across the train stop point CZI is inhibited. The presence of the train stop point CZI is notified by the ground device 22a to the on-board device 12. When it is determined that the predetermined condition is met, the on-board device 12 cancels the train stop point CZI for the train 10. In the other cases, control of stopping the train 10 at or before the train stop point CZI is executed.

In the embodiment, furthermore, a control transition section ZCR is set in the train-leaving control section CZ1 using the control section border CZI as the termination end, and an acceptance confirmation request section WRR is set before the control transition section ZCR in the train travel direction. Ground radio sets 24a, 24b, 24c, 24d, . . . are installed at equal predetermined intervals in each of the train-leaving control section CZ1 and the train-entering control section CZ2, and one ground radio set (e.g., 24a) is in a position relationship in which it can transmit a signal to the neighboring ground radio set 24b and, further, to the ground radio set 24c next to the ground radio set 24b. In the embodiment, the control section border CZI is determined in an intermediate position which is in the equal distance from the ground radio set 24b at the rear end of the train-leaving control section CZ1 and the ground radio set 24c at the front end of the train-entering control section CZ2.

Figure 2:
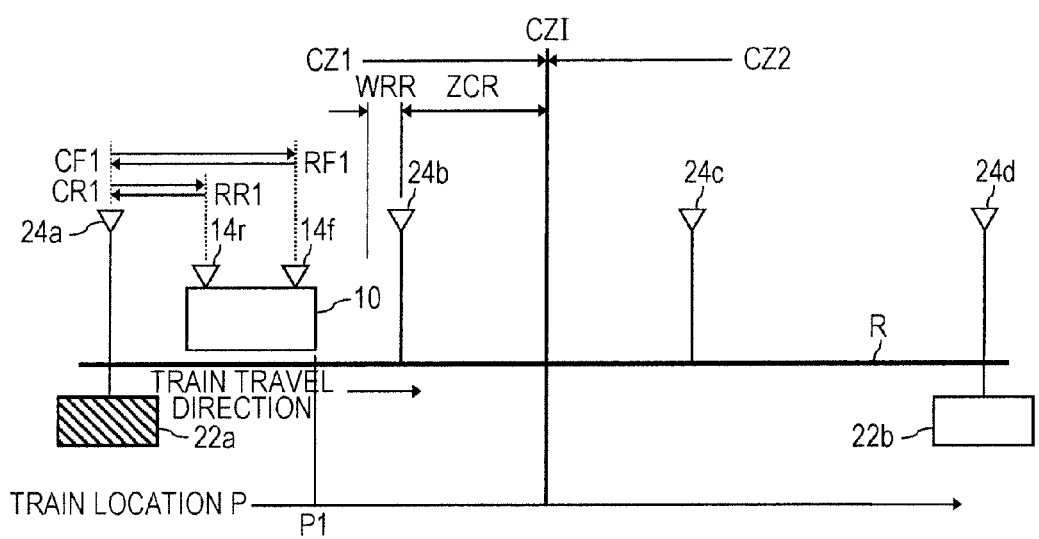
FIG. 2 is an explanatory diagram illustrating operation of the train control apparatus according to the embodiment (train location P1).

FIG. 2 illustrates a state in which the train 10 travels in the train-leaving control section CZ1 and before the acceptance confirmation request section WRR.

The control on the train 10 traveling in the train-leaving control section CZ1 is held by the ground device 22a controlling the section CZ1. The ground device 22a transmits a command signal CF1 from the ground radio set 24a to the front-side vehicle radio set 14f of the train 10 and also transmits a command signal CR1 from the ground radio set 24a to the rear-side vehicle radio set 14r. The command signals CF1 and CR1 include a control signal (e.g., the train stop point CZI) for the train 10. The front-side vehicle radio set 14f sends a report signal RF1 back to the ground radio set 24a in response to the command signal CF1, and the rear-side vehicle radio set 14r sends a report signal RR1 back to the ground radio set 24a in response to the command signal CR1. As information on a train location P, the report signals RF1 and RR1 include the absolute position PRS (identification number of the ground coil) detected by the on-board coil 16 and the travel distance VTD measured by the tachometer generator 18.

Figure 3:
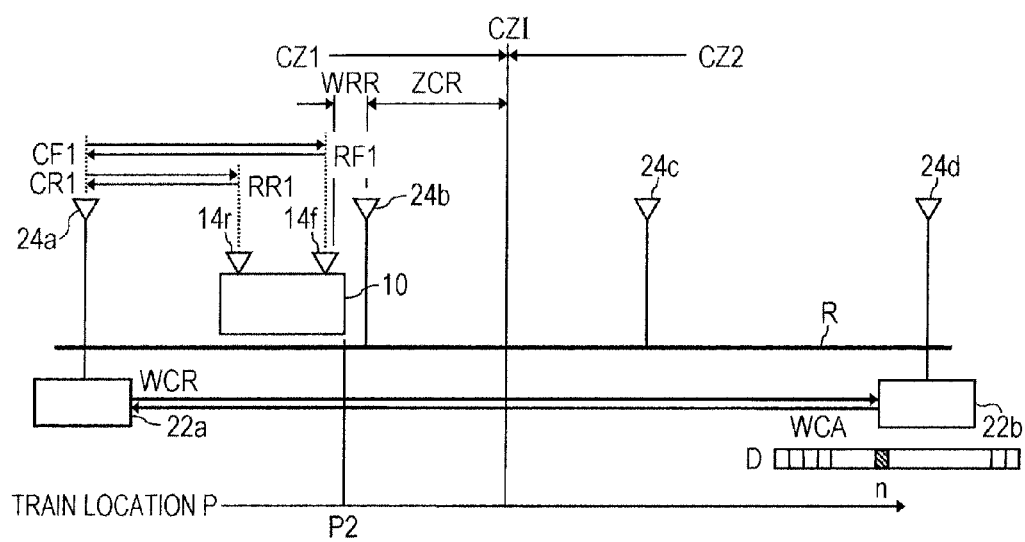
FIG. 3 is an explanatory diagram illustrating the operation in a train location P2, of the train control apparatus.

FIG. 3 illustrates a state in which the train 10 traveling in the train-leaving control section CZ1 is entering the acceptance confirmation request section WRR.

When the front part of the train 10 enters the acceptance confirmation request section WRR, the ground device 22a transmits an acceptance confirmation request signal WCR to the ground device 22b controlling the train-entering control section CZ2 by a point-to-point line method to request to confirm whether the train 10 can be accepted or not. On receipt of the signal WCR, the ground device 22b confirms whether or not there is a vacant window in a signal data string D used for the train control and, in a case in which there is the vacant window, transmits an acceptance confirmation report signal WCA including the identification number "n" of the window back to the ground device 22a. Designation of the vacant window corresponds to a "second communication condition". When receiving the acceptance confirmation report signal WCA including the number "n"

of the vacant window from the ground device 22b, the ground device 22a transmits a signal for deleting the train stop point CZI from the stop points of the train 10 to the on-board device 12 to permit passage of the control section border CZI. The signal can be transmitted by any of the command signals CF1 and CR1. As described above, in the other cases, the train 10 is stopped at or before the train stop point CZI.

Figure 4:
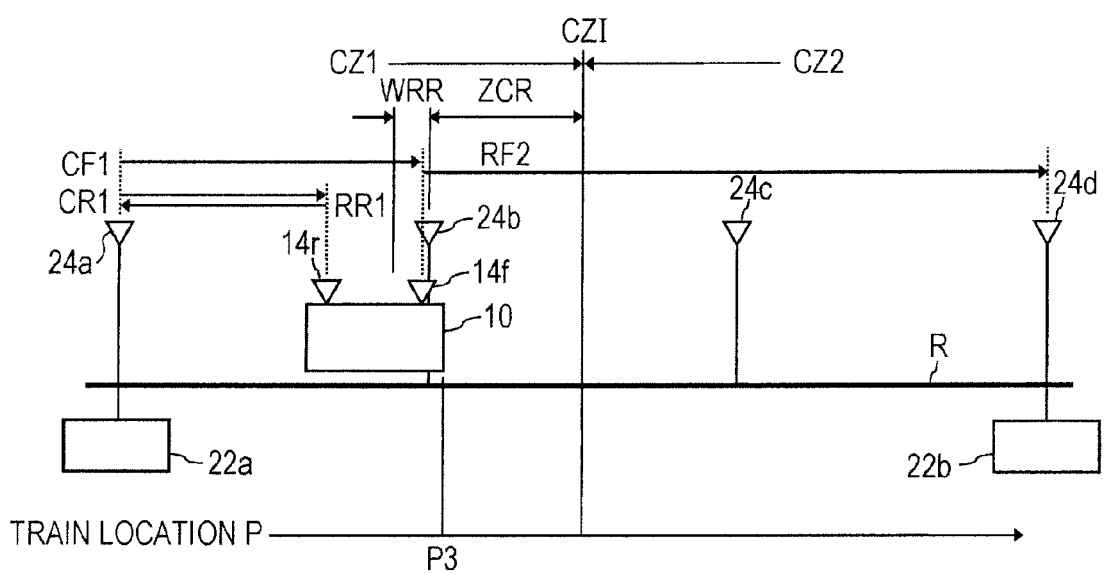
FIG. 4 is an explanatory diagram illustrating the operation in a train location P3, of the train control apparatus.

FIG. 4 illustrates a state in which the train 10 further moves forward and is entering the control transition section ZCR.

When the front part of the train 10 enters the control transition section ZCR, the ground device 22a transmits, to the front-side vehicle radio set 14f, the command signal CF1 instructing transmission of a report signal RF2 to the ground device 22b. A window assigned to the front-side vehicle radio set 14f for sending back the report signal RF2 is the window of the number "n" notified from the ground device 22b to the ground device 22a by the acceptance confirmation report signal WCA. On the other hand, the ground device 22a transmits, to the rear-side vehicle radio set 14r, the command signal CR1 instructing transmission of the report signal RR1 back to itself (the ground device 22a). A window designated for the rear-side vehicle radio set 14r is kept to be the same as that determined by the ground device 22a itself with regard to the control of the train 10. The continuous designation of the window corresponds to a "first communication condition". The ground device 22b which has received the report signal RF2 detects the present location P of the train 10 on the basis of the train location information (the absolute position PRS and the travel distance VTD included in the signal RF2. Since the same train position information is transmitted to the ground devices 22a and 22b, both of the ground devices 22a and 22b can share the train location P. The report signal RR1 corresponds to a "first report signal", and the report signal RF2 corresponds to a "second report signal".

Figure 5:
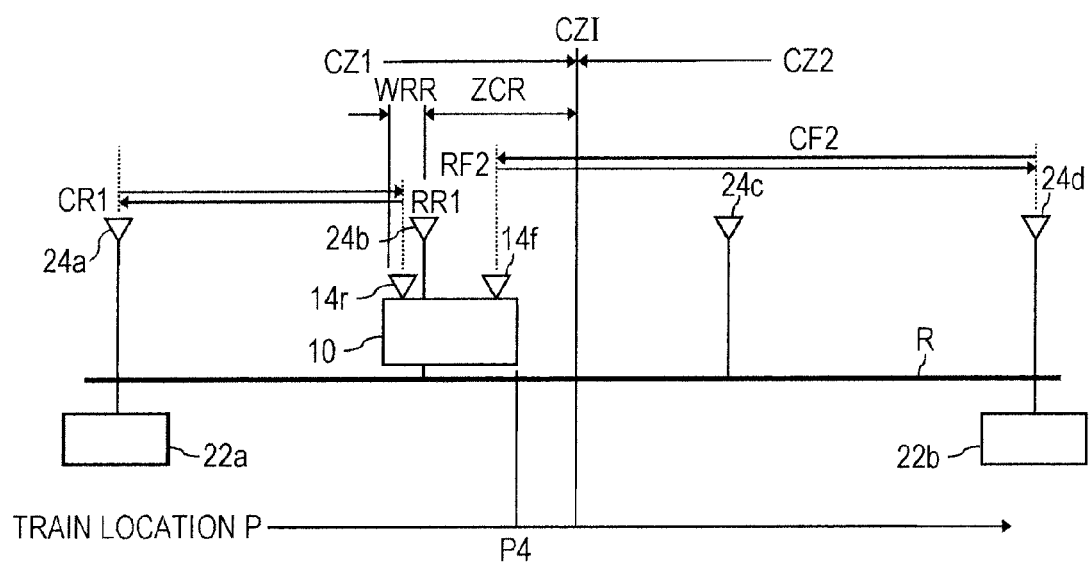
FIG. 5 is an explanatory diagram illustrating the operation in a train location P4, of the train control apparatus.

FIG. 5 illustrates a state in which the train 10 moves forward from the location illustrated in FIG. 4 but does not enter the train-entering control section CZ2.

After the front part of the train 10 enters the control transition section ZCR and the front-side vehicle radio set 14f transmits the report signal RF2 for the first time, the ground device 22a repeats transmission of the command signal CF1 instructing transmission of the report signal RF2 to the front-side vehicle radio set 14f a predetermined number of times (e.g., five times) and then stops transmission of the command signal CF1. When confirming the reception of the report signal RF2, the ground device 22b starts transmitting the command signal CF2 to the front-side vehicle radio set 14f. A window assigned to the front-side vehicle radio set 14f for transmission of the report signal RF2 in response to the command signal CF2 is the window of the number "n" notified earlier to the ground device 22a. Since the control on the train 10 is continuously held by the ground device 22a, the ground device 22a continues transmission of the command signal CR1 to the rear-side vehicle radio set 14r and continuously receives the report signal RR1 from the rear-side vehicle radio set 14r.

A redundancy measure to reliably receive the report signal RF2 by the ground device 22b is taken by stopping the transmission of the command signal CF1 from the ground device 22a after the first transmission of the report signal RF2 (FIG. 4) and repeating the transmission of the command signal CF1 until the stop. Therefore, if reception in the ground device 22b is secured only by the first single transmission of the report signal RF2, the transmission of the command signal CF1 may be stopped by the first transmission instruction of the report signal RF2 to the front-side vehicle radio set 14f.

Figure 6:
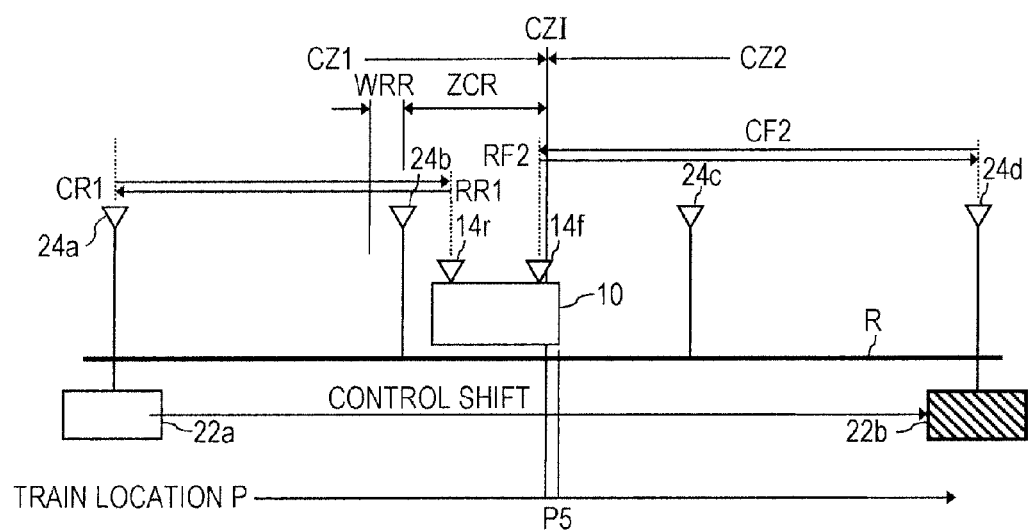
FIG. 6 is an explanatory diagram illustrating the operation in a train location P5, of the train control apparatus.

FIG. 6 illustrates a state in which the train 10 is entering the train-entering control section CZ2.

When the front part of the train 10 passes the control section border CZI and enters the train-entering control section CZ2, the ground device 22a controlling the train-leaving control section CZ1 stops the control on the train 10. On the other hand, the ground device 22b controlling the train-entering control section CZ2 starts controlling on the train 10 when the front part of the train 10 passes the control section border CZI. By the above operation, the control on the train 10 shifts from the ground device 22a to the ground device 22b. The ground device 22a continues signal transmission and reception to and from the rear-side vehicle radio set 14r also after the control is passed to the ground device 22b for the following reason. By obtaining the train location information from the on-board device 12, the train location P can be detected and is reflected in control on another train following the train 10.

Figure 7:
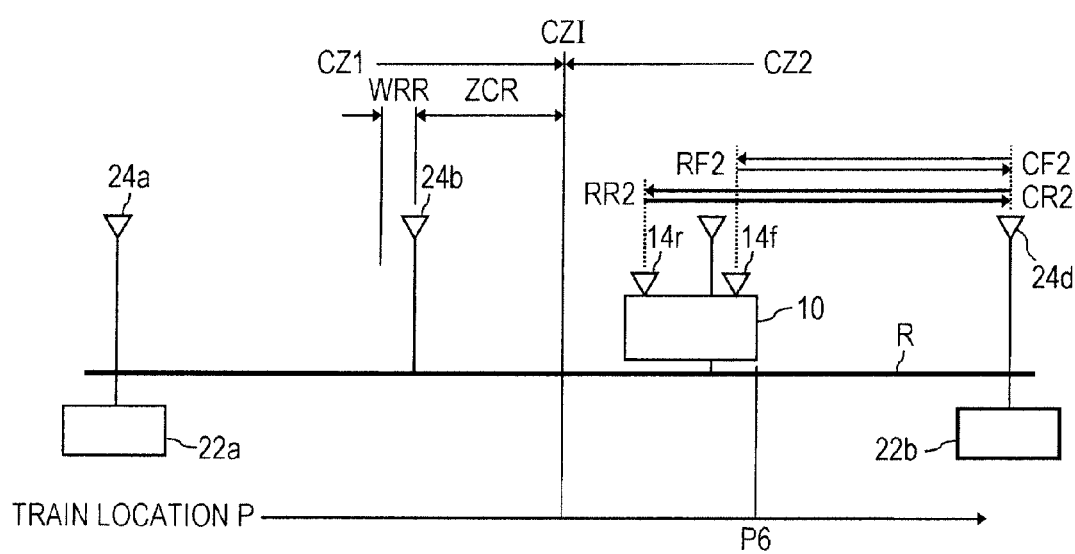
FIG. 7 is an explanatory diagram illustrating the operation in a train location P6, of the train control apparatus.

FIG. 7 illustrates a state in which the rear part of the train 10 passes the control section border CZI and the entire train 10 is in the train-entering control section CZ2.

When the rear part of the train 10 passes the control section border CZI, the ground device 22a stops transmission of the command signal CR1 to the rear-side vehicle radio set 14r. Accompanying it, reception of the report signal RR1 from the rear-side vehicle radio set 14r is also stopped. Therefore, by the stop of the transmission of the command signal CR1, tracing of the train location P is finished. The ground device 22b starts transmission of a command signal CR2 to the rear-side vehicle radio set 14r when the rear part of the train 10 passes the control section border CZI and receives a report signal RR2 responding to the command signal CR2 from the rear-side vehicle radio set 14r. A window assigned to the rear-side vehicle radio set 14r for sending back the report signal RR2 in response to the command signal CR2 is the window of the number "n" notified earlier to the ground device 22a, similarly to the report signal RF2.

As described above, according to the embodiment, when the train 10 enters the control transition section ZCR, the ground device 22a controlling the train-leaving control section CZ1 instructs the rear-side vehicle radio set 14r to send back the report signal RR1, and the ground device 22a instructs the front-side vehicle radio set 14f to send the report signal RF2 to the ground device 22b controlling the train-entering control section CZ2. In this case, the transmission of the report signal RR1 from the rear-side vehicle radio set 14r is performed in accordance with a condition (the window already used) determined by the ground device 22a on the train transmission side, and the transmission of the report signal RF2 from the front-side vehicle radio set 14f is performed in accordance with a condition (vacant window) determined by the ground device 22b on the train acceptance side. Therefore, even in a case in which a communication condition employed by the ground device 22a on the train-leaving side and that employed by the ground device 22b on the train-entering side are different from each other, the report signal RF2 can be effectively received by the ground device 22b. The ground device 22b which has received the report signal RF2 instructs, in response to the reception, the front-side vehicle radio set 14f to send back the report signal RF2 including the train location information (command signal CF2). Consequently, in the ground device 22b which takes over the control on the train 10 from the ground device 22a, the train location P can be grasped and, based on it, the time point of switching the train control from the ground device 22a to the ground device 22b can be accurately determined.

It should be noted that the entire contents of Japanese Patent Application No. 2012-082606, filed on Mar. 30, 2012, on which convention priority is claimed, is incorporated herein by reference.

It should also be understood that many modifications and variations of the described embodiments of the invention will be apparent to a person having an ordinary skill in the art without departing from the spirit and scope of the present invention as claimed in the appended claims.

What is claimed is:

1. A train control apparatus comprising:
   a first ground device provided in a first section in a train travel path; and
   a second ground device provided in a second section in the train travel path, the second section continuing from the first section in a train travel direction,
   wherein the first section includes a control transition section determined using a border between the first and second sections as a terminal end, and an acceptance confirmation request section set before the control transition section in the train travel direction,
   wherein the first ground device transmits and receives information related to train control to and from a train in the first section in accordance with a first communication condition,
   wherein when the train enters the acceptance confirmation request section, the first ground device requests the second ground device to send a report signal including a second communication condition determined by the second ground device in a case of accepting the train to the first ground device,
   wherein when the train enters the control transition section after the first ground device receives the report signal from the second ground device, the first ground device instructs a first radio set mounted on the train to send a first report signal including train location information of the train to the first ground device in accordance with the first communication condition, and instructs a second radio set mounted on the train to send a second report signal including the train location information of the train to the second ground device in accordance with the second communication condition,
   wherein when the first ground device receives the report signal from the second ground device, the first ground device transmits a signal for deleting the border from stop points of the train to at least one of the first and the second radio sets to permit passage of the border, and
   when the first ground device does not receive the report signal from the second ground device, the first ground device transmits a signal to stop the train at or before the border to at least one of the first and second radio sets.

2. The train control apparatus according to claim 1, wherein the first and second communication conditions are different from each other.

3. The train control apparatus according to claim 1, wherein sending the second report signal in accordance with the second communication condition includes sending the second report signal using a vacant window in a signal data string which the second ground device uses for a train control.

4. The train control apparatus according to claim 3,
   wherein the first ground device detects a location of the train on the basis of the train location information included in the first report signal, and when it is detected that at least a front part of the train passes the border on the basis of the location of the train, the first ground device stops transmission of a control signal to the train, and
   wherein the second ground device detects the location of the train on the basis of the train location information included in the second report signal, and when it is detected that at least the front part of the train passes the border on the basis of the location of the train, the second ground device starts transmission of the control signal to the train.

5. The train control apparatus according to claim 4, wherein the first ground device monitors the train by continuing detection of the train location until passage of the rear part of the train across the border is detected after the transmission of the control signal to the train is stopped.

6. The train control apparatus according to claim 1, wherein in a case in which the train has a pair of vehicle radio sets installed in different cars, the first radio set is a radio set provided on a rear side as one of the pair of vehicle radio sets, and the second radio set is a radio set provided on a front side.

* * * * *